Figure 4:
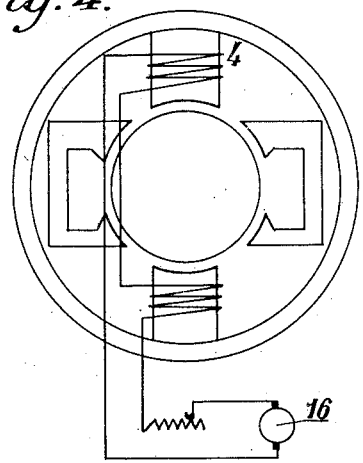

July 14, 1931.                R. SARAZIN ET AL                1,814,061
                           DIRECT CURRENT GENERATOR
                         Filed Aug. 20, 1929        2 Sheets-Sheet 1
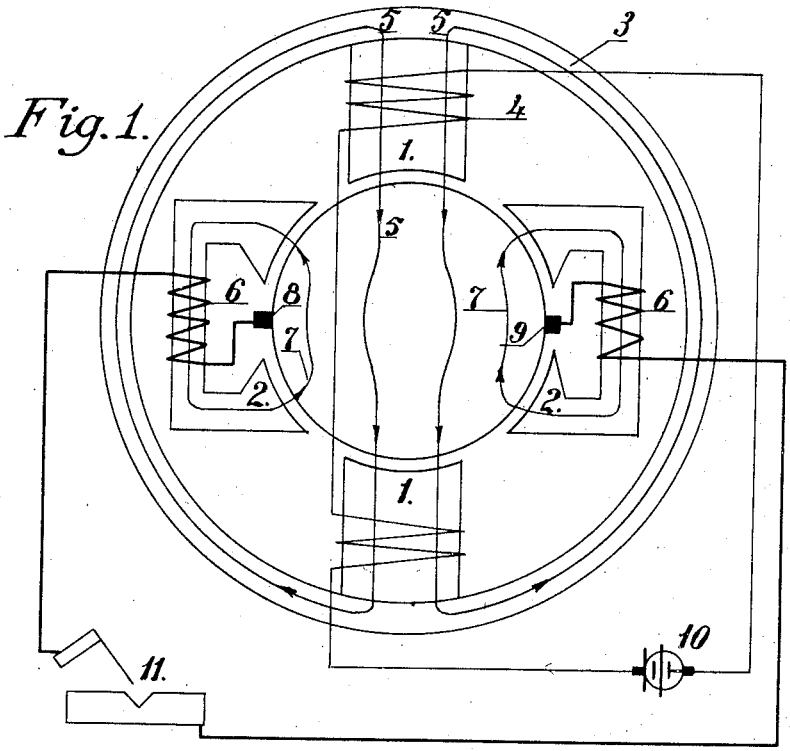
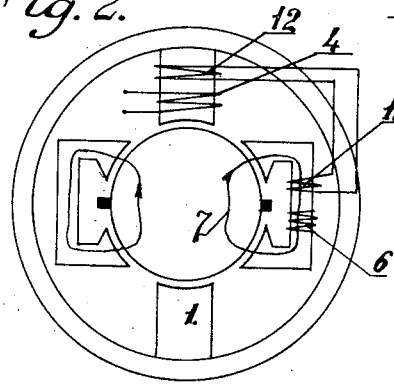
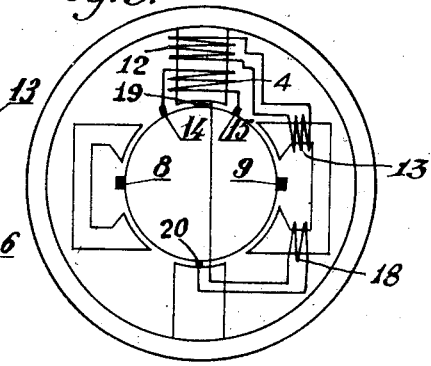
Inventors:
Robert Sarazin and
Marcel Moneyron
By Emil Binnelycke
Attorney July 14, 1931.  R. SARAZIN ET AL  1,814,061
DIRECT CURRENT GENERATOR
Filed Aug. 20, 1929  2 Sheets-Sheet 2

Inventors:
Robert Sarazin and
Marcel Moneyron
By Emil Bömelycke
Attorney

Patented July 14, 1931

1,814,061

UNITED STATES PATENT OFFICE

ROBERT SARAZIN AND MARCEL MONEYRON, OF NEUILLY-SUR-SEINE, FRANCE

DIRECT CURRENT GENERATOR

Application filed August 20, 1929, Serial No. 387,110, and in France September 1, 1928.

The present invention relates to a direct current generator having a variable tension and a constant power. The said generator is chiefly adapted for use in welding by the electric arc, which requires a starting tension greatly in excess of the normal welding tension, also a constant power of the arc, and a uniform functioning irrespective of the abrupt variations of current.

It is an observed fact that the electric generators employed in arc welding have a characteristic curve which has a great drop, with a limited short-circuit current. This result is usually obtained by demagnetizing the exciting poles of the machine by means of a series winding which carries the welding current, but at each variation of the current, and for instance when the arc is started, the field circuit is not instantly demagnetized, by reason of the effects of mutual induction occurring between the magnetizing winding, the demagnetizing winding, and the armature, thus occasioning a considerable flow of current which may be prejudicial to the electric welding operation.

All such defects are obviated in the improved electric generator of the present invention, which comprises auxiliary poles forming part of complete magnetic circuits which are distinct from the main magnetic circuit.

The characteristic curve of this machine has a considerable drop, and it remains in its proper condition irrespective of the variations of current.

The several details of the invention are specified in the following description, with reference to the accompanying drawings, in which:

Fig. 1 shows a constructional form of an electric generator according to the invention.

Figs. 2, 3, 4, 5, 6, and 7 represent different modifications.

The electric generator shown in Figure 1 comprises a magnetic exciting circuit passing through the main poles 1—1 and the frame 3, and a magnetic circuit passing through the auxiliary poles 2—2 which are C-shaped, as represented in the drawings. This second circuit is therefore entirely distinct from the first.

Each main pole 1 carries a fine wire winding 4 supplied by a source of current 10 at constant tension. The main flux is shown in the drawings by the mean line of force 5.

The auxiliary poles 2—2 carry demagnetizing windings 6, supplied by means of brushes 8—9, perpendicular to the line of the main poles 1, and said windings are in series with the welding arc 11.

The flux produced in each auxiliary pole 2 is shown by the line 7, and it is proportional to the current furnished by the machine.

Between the brushes 8 and 9, the electromagnetic force at no-load is equal to that which is produced by the flux 5; when operating on load, the electro-motive force diminishes due to the flux 7 traversing the armature in the contrary direction to the flux 5. During the short-circuit, the electro-motive force produced by the flux 5 is equal and opposite to that produced by the flux 7. The poles 1 and 2 do not act directly upon one another, and the mutual induction of the corresponding windings is very small; but the windings of the poles 1 and 2 produces with the armature a slight mutual induction which tends to slightly increase the flux 5 during the short-circuit.

Fig. 2 shows an arrangement for obviating this variation of the flux. For this purpose, the poles 1 and 2 are provided with two fine wire windings which are connected together and are independent of all external sources of current.

When the current increases in the machine, the corresponding variation of the flux 7 will induce in the winding 13 and E. M. F. supplying the winding 12 in a direction such that it produces a slight reduction of the magnetic flux 1. Should the current of the machine diminish, the winding 13 produces a slight additional flux in the circuit 1.

The fine wire winding 4 is supplied at a constant tension which can be furnished by a pair of auxiliary brushes 14—15 situated directly below the main poles 1 and on a line parallel to that of the main brushes 8—9, as shown in Fig. 3. The tension on the armature between the brushes 14 and 15 is constant, since the portion of the armature between said brushes is subjected only to the flux 5.

A separate excitation may also be employed, as shown in Figure 4.

Electric arc welding requires variable currents for the melting of electrodes of different diameters, and the invention comprises means whereby the welding current can be varied.

Figure 5:
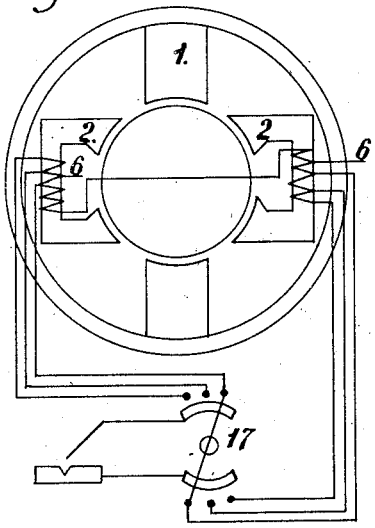

Fig. 5 shows a welding generator in which the poles 2 have a heavy wire winding 6 carrying the main current of the machine. A circuit-changing device 17, employing various points brought out of the winding 6, permits of varying the number of antagonistic ampere-turns of the poles 2 and hence the current of the machine.

Figure 6:
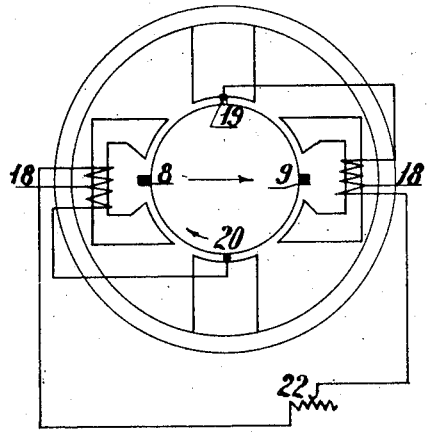

Fig 6 shows a welding generator in which the poles 2 carry a fine wire winding 18, supplied by a tension taken from the terminals of the two brushes 19—20 which are perpendicular to the main brushes 8—9. On no-load, the E. M. F. induced between the brushes 19 and 20 is zero; and on load, the reaction flux of the armature, which is directed according to the line of the brushes 8—9, provides between the brushes 19 and 20 an E. M. F. proportional to the current supplied by the machine.

The current is varied by bringing the brushes 19—20 nearer together, so that the line of these brushes will always remain perpendicular to the main brushes 8—9, or by inserting a rheostat 22, as shown in Figure 6. For a given tension between the brushes 8 and 9 and for a constant flux 6, the flux 7 must be also constant, and hence the current in the windings 18 and the tension at the terminals of said windings must remain constant.

When the brushes 19—20 are brought nearer together, the armature current should increase in order that the tension at the ends of the windings 18 shall remain constant. If a resistance is mounted in the circuit 19—20, the armature current must increase in order that the windings 18 shall carry the same current.

Figure 7:
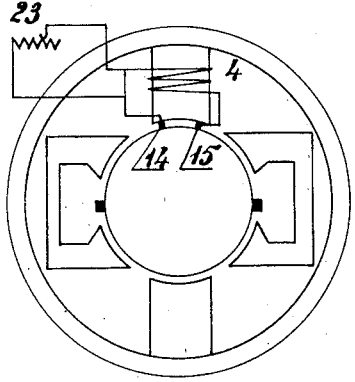

Fig. 7 shows a welding generator in which the current can be varied by changing the starting tension of the machine which is effected by inserting an exciting rheostat 23 in the circuit 4, or by moving the brushes 14—15 from or towards one another.

Fig. 3 shows a construction for the machine, in its most advantageous form, and herein the field poles 1 use a tension supplied by the terminals of the brushes 14 and 15; the current is regulated by bringing together the brushes 19—20 supplying the windings 18 disposed on the field poles 2. This machine affords a current which is variable within wide limits without change in the starting tension of the arc which depends upon the windings 4 and the spacing of the brushes 14—15. When using small currents, the no-load tension can even be increased in order to facilitate the use of the tension starting the arc, by separating the brushes 14 and 15, this movement of the brushes can also serve to compensate the small variations of current occasioned by the heating of the machine.

No special means have been above specified for moving the brushes 14—15 and 19—20, but it is evident that all suitable mechanical means can be thus employed.

We claim:

1. A constant-speed, direct current generator, comprising a main magnetic exciting circuit; electrical windings around said circuit supplied by a constant electromotive force; auxiliary magnetic circuits, having a demagnetizing action, independent of the main exciting circuit; and means for feeding the windings of said auxiliary circuits with an electromotive force which varies according to the current output of the machine; said means embodying two brushes adjustable in relation to the armature of the machine and arranged in a line parallel with the main exciting flux of the machine.

2. A constant-speed, direct current generator, comprising a main magnetic exciting circuit; auxiliary magnetic circuits, having a demagnetizing action, independent of the main exciting circuit and fed by an electromotive force which varies with the current output of the machine; two brushes adjustable in relation to the armature of the machine and arranged in a line parallel with the main exciting flux of the machine, the windings of the auxiliary magnetic circuits being branched on said brushes; two adjustable brushes disposed at opposite sides of one main pole; and windings disposed around the main magnetic circuit and terminating at the second-named brushes so that the portion of the armature comprised between said second-named brushes is influenced solely by the flux emitted by said main pole.

3. A constant-speed, direct current generator, comprising a main magnetic exciting circuit; auxiliary magnetic circuits, having a demagnetizing action, independent of the main exciting circuit; and two windings connected together and independent of any external electromotive force, said windings being wound, respectively, on the main poles and on the auxiliary magnetic circuits so as to set up a compensating mutual induction.

In testimony whereof we affix our signatures.

ROBERT SARAZIN.
MARCEL MONEYRON.